United States Patent [19]

Shur et al.

[11] Patent Number: 5,461,665
[45] Date of Patent: Oct. 24, 1995

[54] VOICE PROCESSING SYSTEM

[75] Inventors: Shlomo Shur, Fairfield, Conn.; Dennis E. McPhillips, Brewster, N.Y.

[73] Assignee: Executone Information Systems, Inc., Milford, Conn.

[21] Appl. No.: 22,683

[22] Filed: Mar. 1, 1993

[51] Int. Cl.⁶ ................................................ H04M 3/50
[52] U.S. Cl. .............................. 379/67; 379/88; 379/89; 379/95
[58] Field of Search ................................ 379/67, 89, 96, 379/94, 88, 80, 198, 100, 201, 202, 207, 216, 69, 214

[56] References Cited

U.S. PATENT DOCUMENTS

| | | | |
|---|---|---|---|
| 4,652,700 | 3/1987 | Matthews et al. | 379/89 |
| 4,707,804 | 11/1987 | Leal | 340/825.32 |
| 4,797,672 | 1/1989 | Kousa | 340/825.3 |
| 4,901,341 | 2/1990 | Carter et al. | 379/67 |
| 4,962,449 | 10/1990 | Schlesinger | 364/200 |
| 5,003,575 | 3/1991 | Chamberlin et al. | 379/89 |
| 5,317,628 | 5/1994 | Misholi et al. | 379/89 |
| 5,333,266 | 7/1994 | Boaz et al. | 379/89 |

*Primary Examiner*—James L. Dwyer
*Assistant Examiner*—Scott Wolinsky
*Attorney, Agent, or Firm*—Dilworth & Barrese

[57] ABSTRACT

A voice processing system coupled to a plurality of telephones, each having a mailbox, for communicating with callers to the telephones. The voice processing system is capable of recording, manipulating and transferring voice messages to and from each mailbox. Mailbox and message status information can be audibly announced to a caller having a valid access code.

7 Claims, 6 Drawing Sheets

| Operating System |
| --- |
| 201 |

| File Management System |
| --- |
| 202 |

| Automated Attendant System |
| --- |
| 203 |

| System Prompts and Greetings |
| --- |
| 204 |

| Diagnostic Programs |
| --- |
| 205 |

| Voice Mail Codes |
| --- |
| 206 |

| Mailboxes |
| --- |
| 207 |

FIGURE 2

[MAILBOX MESSAGE SCREEN]

MESSAGE ENVELOPE

MAILED BY [??????]
  DATE   [02/10/93]                                    STATUS... [U]
  DAY    [4]                                           TIME   [13:15:51]
MSG NAME [VABBJ131549]
MSG TYPE [___]

[STATUS]

[U] Unheard msg.                    [H] Heard msg.
[V] Priority Unheard msg FIFO       [G] Priority heard msg FIFO
[T] Priority Unheard msg LIFO       [I] Priority heard msg LIFO
[C] System msg to user.

[MSG TYPE]

[P] Confidential msg                [C] Confirm. req. msg
[C] Copy of Confidential msg        [N] Note of none rcv.
[O] Copy of Normal msg              [D] Note of msg erase x-1 day
                                    [E] Note of msg erase
                                    [O] Note of Outcall cancel
                                    [+] Msg Skipped/Heard Flag

FIGURE 5

VOICE PROCESSING SYSTEM

FIELD OF THE INVENTION

The present invention relates to a voice processing system which connects to a telephone system for handling telephone calls. More particularly, a voice processing system capable of storing, manipulating and transferring voice mail messages.

BACKGROUND OF THE INVENTION

It has generally been known that telephone answering machines may be used to exchange information without requiring simultaneous participation by the callers and receivers. In facilities having multiple telephone lines or private branch exchanges (PBX), voice mail systems are used to accomplish the exchange of information between users within a voice system (a subscriber) or callers from outside the system. Different from the answering machines, voice mail systems include intelligence to process and sort through the multiple call sources and receiver destinations. The intelligence in the voice mail systems, usually in the form of a computer and associated software controls, affords voice mail system users a multitude of options for manipulating the messages. For example, U.S. Pat. No. 5,003,575 to Chamberlin et al. describes a voice mail system which advises the mailbox user of the status of his mailbox, e.g., the number of messages received, and the option to retrieve only a portion of the recorded messages. In U.S. Pat. No. 4,652,700 to Matthews et al., the proposed system enables the user to deposit a message in the memory for automatic delivery to other mailboxes in the system and to automatically delete the message after the message has been delivered to the selected recipient. The voice mail intelligence also makes possible other features such as caller options to, review, edit, erase or label their messages prior to their delivery to the designated mailbox(es); receiver options to retrieve, reply or forward a stored message; and mailbox owner (subscriber) options to tailor their mailboxes to answer with different greetings at different times or deliver their messages to other mailboxes. Some systems may include different levels of mailboxes having different access requirements.

In the present business environment, voice mail systems are increasingly relied upon as the preferred means of communication, both internally among subscribers and externally with clients or potential customers. It becomes unavoidable that with the increased usage, there will be increases in messages left in mailboxes having confidential or proprietary information. Therefore, there is a need to provide subscribers with improved monitoring information regarding the activities of their mailboxes. Obviously, any implementation which results in a more efficient operation of the voice mail system will reduce the amount of time and resources allocated to the system, which translates to reduced costs.

SUMMARY OF THE INVENTION

The voice processing system according to the present invention includes a processor, software controls and circuitry to convert a voice message to digital signals, store the message in a storage medium and process or manipulate the messages according to user commands. The voice processing system converts the stored information back to human speech when it is retrieved. The voice processing system according to the present invention provides a multitude of user options, including: send messages in telephone answering and voice mail mode; send copies of messages; send messages to multiple destinations and group distribution lists; obtain a summary count of messages waiting for review; erase, reply, save, replay, or skip a message; receive mailbox envelope information indicating status of the mailbox including the date, time and sender; and change recorded name, personal greeting and access code.

In one embodiment of the present invention, each user or subscriber of the system is assigned a mailbox number for his private use. Each mailbox is protected by a user-defined access code. The mailbox and the information stored therein can be accessed only by entering the exact access code. Each mailbox includes an associated status register for storing status information including the number of messages in the mailbox; the time and date corresponding to when each message was recorded; which of the recorded messages has previously been accessed; and the time and date of each access to the mailbox.

The system according to the present invention also provides a subscriber with updated information of the messages he has previously sent to other subscribers of the system. Under certain conditions, the message originating subscriber may further manipulate the messages already sent. For example, the originator subscriber may determine whether the recipient subscriber has accessed the message sent by the originator subscriber. If the message has not been accessed, the originator subscriber may change or cancel the message.

The voice processing system according to the present invention is also capable of prioritizing access to mailboxes. For example, when a subscriber requests access to his mailbox while someone is accessing the same mailbox, the person already in the mailbox is disconnected and the subscriber will be granted access.

BRIEF DESCRIPTION OF THE DRAWINGS

FIG. 2 illustrates the major components of the software programs according to the present invention;

FIG. 2A illustrates the major sub-components of mailbox memory according to the present invention;

FIG. 5 shows a mailbox message envelope and information regarding each message in the envelope.

DETAILED DESCRIPTION OF THE INVENTION

Figure 1:
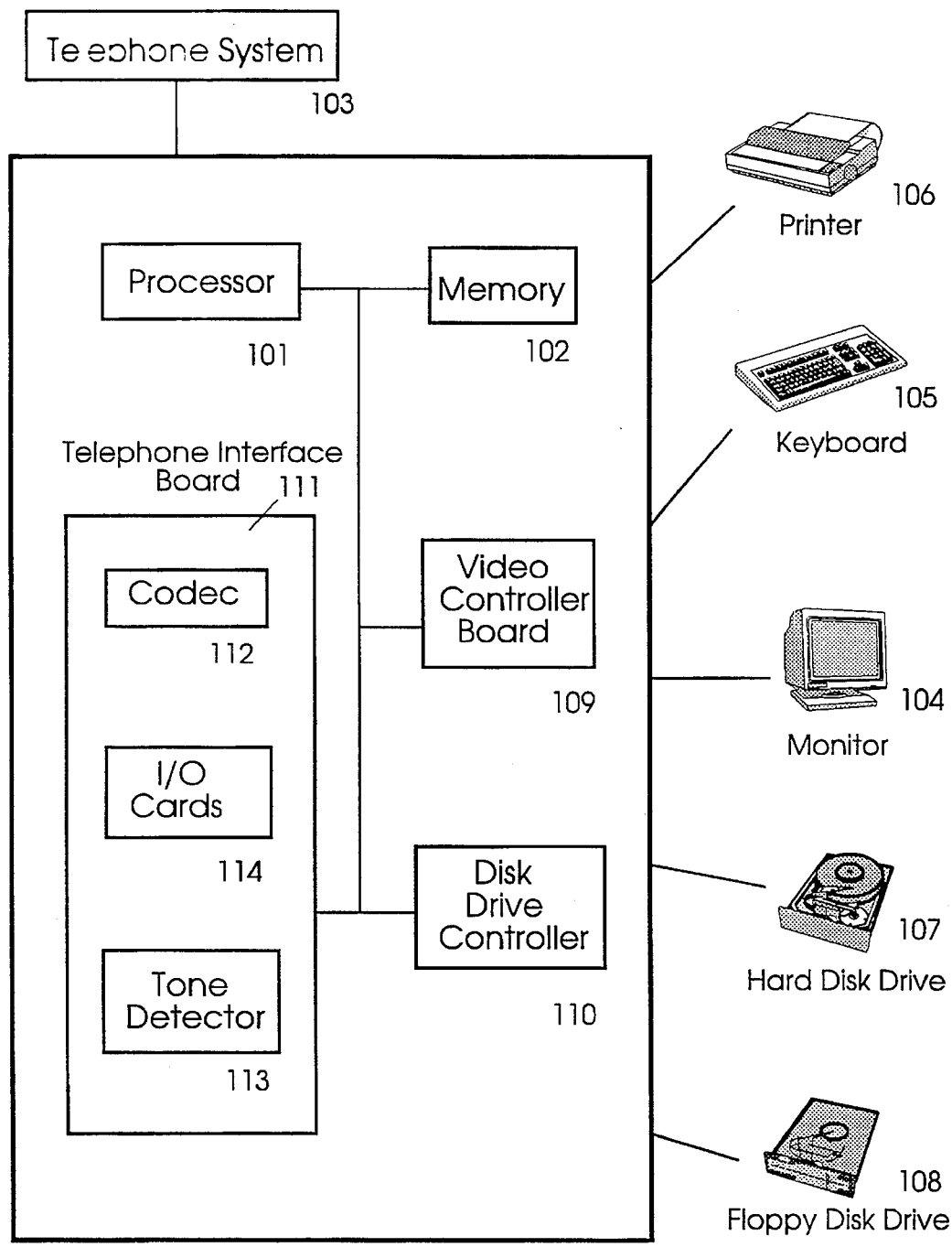
FIG. 1 illustrates a block diagram of the hardware components of the voice processing system according to the present invention.

FIG. 1 illustrates a block diagram of the hardware components of the voice processing system according to the present invention. A processor 101 directs the operations of the voice processing system according to the present invention. The operation involving the processor 101 include: monitoring control and status signals; transferring data in and out of memory; coordinating the conversion of voice messages to digital data and digital data to voice and transfer of data including voice messages; executing stored programs; and interfacing with user interfaces and incoming calls. The processor 101 may be a commercially available microprocessor such as an Intel® 80286 or any microprocessor having comparable performance characteristics. A memory 102 provides temporary and permanent storage of data and application and control software. The memory 102 includes a RAM which provides high speed access of the stored data by the processor 101 and a ROM for providing nonvolatile storage of operation software.

Monitor display 104, keyboard 105, printer 106, hard disk drive 107 and floppy disk drive 108 are user interfaces for interfacing the voice processing system. The monitor display 104 is controlled by the processor 101 through a video controller board 109. The hard disk and floppy disk drives are controlled by the processor 101 through a disk drive controller 110. The manner of controlling the above user interfaces are well known to one ordinarily skilled in the field of computer control. The hard disk 107 should provide sufficient capacity for storing software including operating and application programs including those set forth in FIG. 2. The hard disk 107 also stores individual mailboxes and information relating to each mailbox. A 200 megabit hard disk is used in the preferred embodiment. The floppy disk drive 108 is used initially to set up the system and to load the system software onto the hard disk 107. After the system is set up, the floppy disk drive 108 may be used to make backup copies of the system software and configuration data, and to perform software upgrade. A telephone interface board 111 interfaces the voice processing system according to the present invention to a telephone system 103 having multiple telephone stations such as a PBX (Private Branch Exchange). The telephone interface board 111 includes: a codec 112 for converting analog voice to digital signals and digital signals to audio signals or voice; a tone detector 113 for detecting DTMF (Dual Tone Multi-Frequency) signals generated by the depression of the keys of a telephone dialpad and for converting such detected signals into digital signals; and input/output (I/O) cards 114, preferably having four I/O ports, for connection to telephone trunk lines through the PBX system. Preferably, a telephone interface board such as the D141B, commercially available from the Dialogic® Corporation, Parsipanny, N.J., or any telephone interface board having equivalent performance characteristics may be used.

FIG. 2 illustrates the major components of the software programs resident in the hard disk 107. These software programs include an operating system 201, a file management system 202, an automated attendant system 203, system prompts and greetings 204, diagnostic programs 205, and voice mail codes 206.

The operating system 201 manages the operations of the voice processing system. For example, it guides the processor 101 to assign hardware components for performing specific tasks and arrange the order of the tasks. It also monitors the flow of information in and out of the processor 101 and the memory devices. The file management system 202 includes programs to: integrate the voice processing system to the PBX; configure the system after integration; assign mailboxes to subscribers and set up mailbox parameters and access levels; and monitor and update mailbox activities and status information. The system administrator of the voice processing system interacts with the file management system 202 by using the monitor display 104 and keyboard 105.

The auto attendant system 203 may be set up to execute upon receipt of an incoming call. It includes the various greetings and prompts 204 to identify to the caller, for example, what number or entity he has reached and to interactively guide the caller in selecting options or accessing mailboxes 207. The greetings and prompts 203 are converted to human voice by the codec 112 prior to its outgoing delivery to the caller. The diagnostic program 205 includes self-test programs which may be automatically executed when the system is turned on to check the health of the components of the voice processing system. Other diagnostic programs may be executed by the system manager to isolate specific system or component faults.

According to a preferred embodiment of the present invention, each telephone station owner or subscriber is assigned a mailbox in memory for storing information relating to the subscriber including data representing voice messages. Each mailbox 1, 2, 3, . . . , n may be associated with its owner by using a memory location having an address the same as the extension of the subscriber telephone. A block of memory is created in the hard disk 107 for each mailbox. Each mailbox memory block 210 as shown in FIG. 2A, includes a mailbox 212, a status register 214 and a message envelope 216. The status register includes status data such as the number of messages in the mailbox and the time and date of each access to the mailbox. The message envelope stores information regarding each message associated with the mailbox, including messages sent and received by the mailbox owner or subscriber. Information regarding received messages includes message status, message type and other pertinent message data. FIG. 5 shows an exemplary mailbox message screen displaying the information in the mailbox message envelope. As shown in FIG. 5, message data includes the name or extension of the sender, the time and date of delivery of the message, and the message name. The message status information in the message envelope includes whether the message has been heard and whether the message has been prioritized in a FIFO (first in first out) or LIFO (last in first out) format. The message type information includes whether the message is normal or confidential and whether the message has previously been accessed, skipped over or heard during that process.

The mailbox message envelope may be retrieved by the mailbox owner or by the system administrator and displayed on the monitor 104. Alternatively, the same information may be converted into voice and delivered to the subscriber's telephone station. Further, the message envelope information can be displayed in a coded format on a display on the subscriber's telephone station. A subscriber may retrieve the coded message information for display or scan the information by entering preassigned keys on the dialpad of the telephone designated and recognized by the processor 101 as signaling the request of the message envelope information on display. The coded letters representing the status and type of the message are displayed. The message name is also coded to include information. For example, the message name VABBJ131549 as shown in FIG. 5 conveys the following information when reading the message name from left to right: "V" indicates the message is a voice message and not data; "A" to indicate that the message was sent from node number 1 of the PBX (the order of the alphabet is used instead of numbers to facilitate more than 10 nodes); the first "B" indicates channel number 2 of the PBX from which the message was sent; the second "B" for the month of February; "J" for the 10th day of the month; and "131549" indicates the military time of the delivery of the message. The coding of the origination of the message in node and channel numbers of the PBX ensures that each message is given a unique name even when two messages arrive at the same time.

The size of each mailbox memory block should be sufficient to store data representing, for example, up to 10,000 messages. The maximum number of messages which may be stored in each mailbox may be adjustable by the system administrator. A memory monitoring program monitors the memory space available for the messages and the percentage of space available is displayed to the system administrator. When the percentage reaches 10%, a warning message that the memory is close to full is sent to all subscribers. When the percentage reaches 2%, the program prevents further recording of any data and transfers all calls to the operator.

The data representing voice messages are converted from human voice to digital signals by the codec 112 and is compressed prior to being stored in the hard disk 107. The voice mail code program 206 includes the user access code or password for each mailbox. After the caller selects to access a mailbox, the processor 101 prompts the caller for a password and when received, it is matched against the preassigned password stored in the voice mail codes 206. The mailbox is accessible by the caller only when the password matches. Time and date information is retrieved by the processor 101 whenever there is access to a mailbox and the time and date information is posted in the status register of that mailbox. The mailboxes 207 may also be configured to allow access to the status register or the mailbox message envelope only upon entry of a second level code. This allows a subscriber to access the mailbox status register and message envelope without having access to the actual messages.

Figure 3:
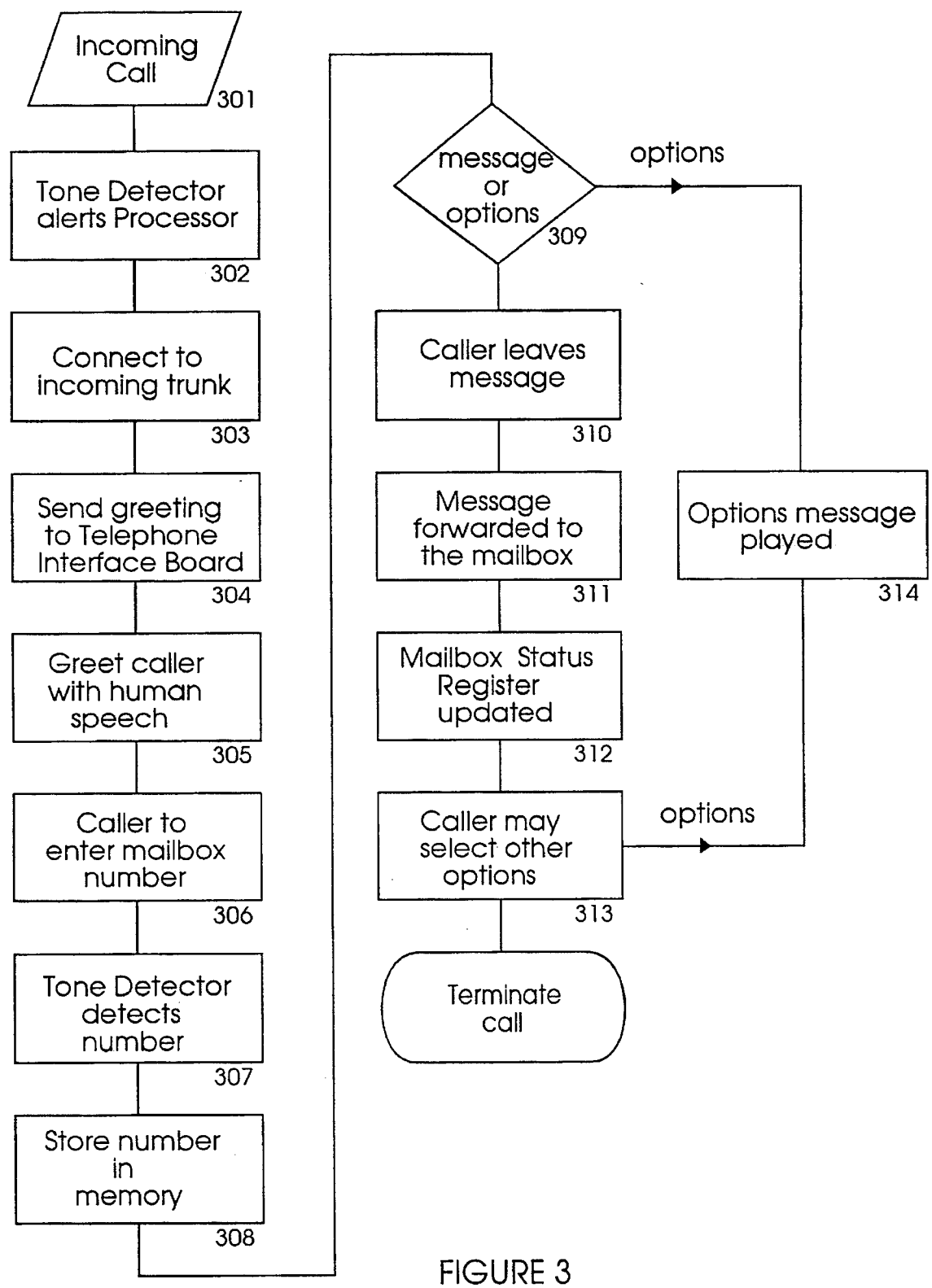
FIG. 3 is a flow diagram of an exemplary operation of the voice processing system according to the present invention.

FIG. 3 is a flow diagram which illustrates an exemplary operation of the voice processing system upon receiving a call. Referring to FIG. 3, when a call comes in via one of the four ports of the I/0 card 114 through the PBX (step 301), the tone detector 112 detects the incoming tone and alerts the processor 101 (step 302). The processor 101 in turn instructs the telephone interface board 111 to connect to the incoming line trunk through the PBX (step 303). After such connection is established, the processor 101 retrieves a prerecorded greeting message from the hard disk 107 and forwards the message to the telephone interface board 111 (step 304). The codec 112 translates the digital message into human voice and plays the message to the caller through I/O cards 114 (step 305). The preprogrammed message asks the caller to enter an extension or mailbox number via the dialpad (step 306). The tone detector 113 detects the selected number and informs the processor 101 of the selection (step 307). The extension or mailbox number, which preferably is the address of the mailbox location allocated in the hard disk 107, is temporarily stored in RAM 102 (step 308). The caller is then prompted to select options such as to leave a message or to access the selected mailbox (step 309). If the caller chooses to leave a message, the system instructs the caller to begin recording after a tone (step 310). The codec 112 converts the caller's message into digital data and the processor 101 forwards the data to the locations in the hard disk 107 allocated for the selected mailbox (step 311). The digital data may be further compressed prior to storage in the hard disk 107.

Upon delivery of the message to the mailbox, the processor 101 updates the mailbox status register (step 312) by incrementing by one the number in the location of memory in which the number of messages received for the mailbox is monitored. The processor also retrieves the current time from a real time clock and stores the time in the mailbox status register (step 312). The real-time clock is a timer in memory which is set with the actual time and date during the installation of the system and is kept running in real time. It can be changed only by the system administrator. While the status information is being assembled, the caller may be informed with a greeting to select other options (step 313). An option greeting having a selection prompt is played and the caller may select other options (step 314). If no option is selected, the processor 101 disconnects the call.

Figure 4:
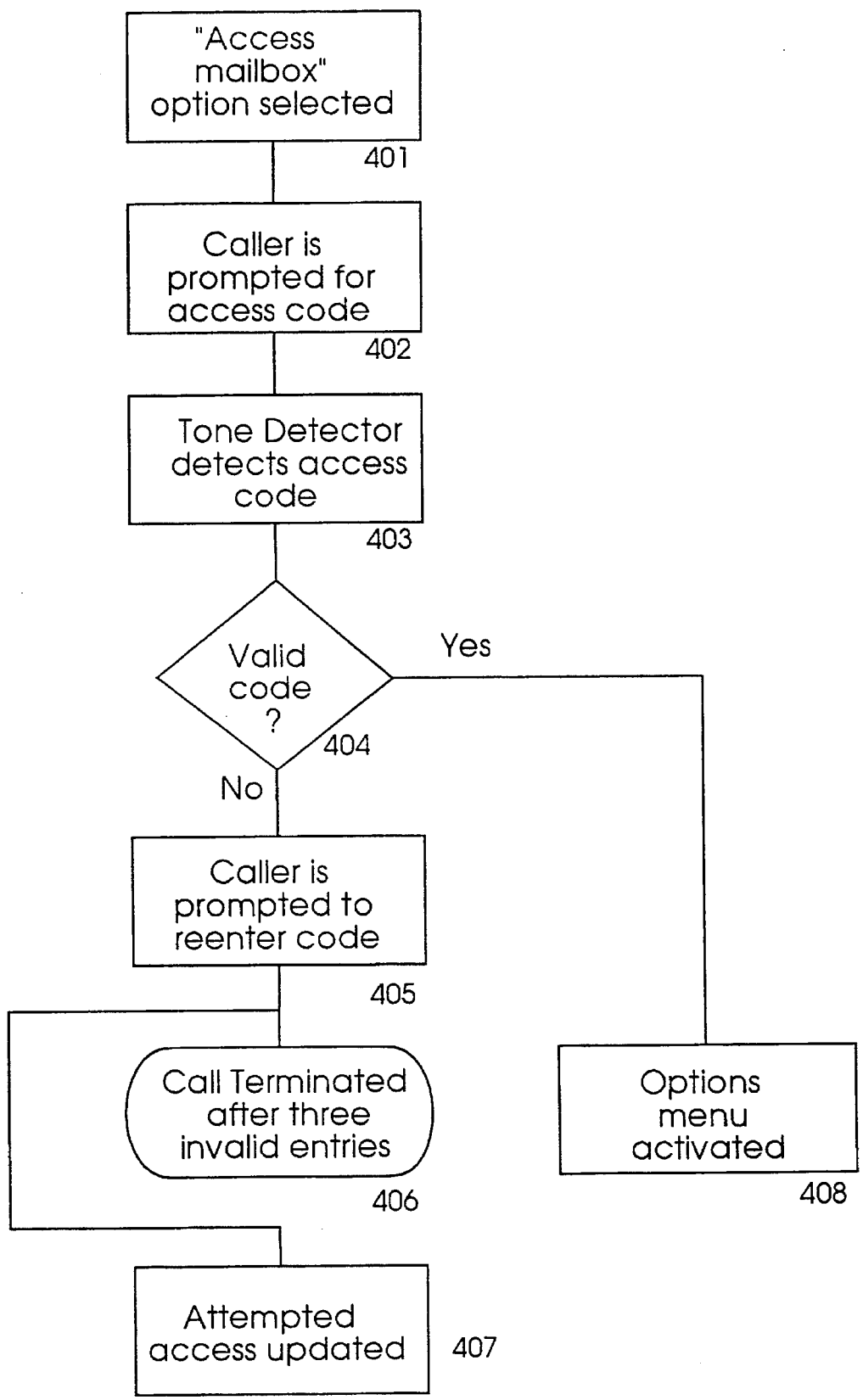
FIG. 4 illustrates a flow diagram of an operation of the voice processing system according to the present invention when a caller successfully accesses a mailbox.

FIG. 4 is a flow diagram describing a flow process when the caller selects the "access mailbox" option (step 401). Upon receipt of the access mailbox selection, the processor 101 prompts the caller to enter his user access code or password (step 402). The password entered by the caller is decoded by the tone detector 113 and converted to digital data and forwarded to the processor 101 (step 403). The processor 101 compares the password to the preassigned password associated with the selected mailbox (step 404). If it is determined by the processor 101 from the comparison that the password does not match or is an invalid code, the processor 101 replays the prerecorded access code request message (step 405). The newly entered password is again compared to the preassigned code associated with the selected mailbox. If no valid password or access code is found after three entries, the processor 101 directs the telephone interface board 111 to terminate the call and disconnect the caller from the system (step 406). While the call is terminated, the processor 101 updates the mailbox status register (step 407) and records the attempted access by incrementing by one the number in the memory location allocated for monitoring the number of attempts made to access the mailbox. The processor 101 also retrieves the time from the real-time clock and stores the time in the mailbox status register. If the caller entered a password or user access code which matched the stored access code associated with the mailbox, the processor retrieves the time and date information from the real-time clock and the time and date information is posted in the status register of the mailbox.

Thus, the mailbox status register includes information such as the number of messages received, the times at which the mailbox was accessed and the number of attempts made to access the mailbox and the times of the attempts. These status information may provide a clue to the mailbox owner that an unauthorized user may be attempting to break into the mailbox. When the number of attempted accesses is extraneously large, the attempted accesses might have been dialed by a computer. The owner may then be alerted to take precautions to safeguard his mailbox.

Upon the grant of access to a mailbox, the processor 101 activates the options menu which allows the subscriber to choose from options such as (1) listen to messages, (2) send messages, (3) select further options, (4) check message envelope and status register (step 408). Each mailbox may be individually configured to block access to certain information such as the information in the status register or the message envelope unless the subscriber enters a second level code.

Upon selection of the listen option (1), the subscriber is presented with the messages in a preconfigured format, e.g., LIFO. While listening, the subscriber can further manipulate the message by selecting options such as repeat, save, erase, or listen to the message envelope. If the message envelope is accessed, the envelope information can be retrieved from the mailbox, converted to voice by the codec 112 and listened to by the subscriber.

When the subscriber selects option (2) to send a message, the system records the subscribers voice message and prompts the subscriber for the recipient subscriber's mailbox number. The voice message is digitized by the codec 112 and the digitized data is delivered to the recipient subscriber's mailbox. The processor 101 retrieves the time and date information, code the message name and posts the information in the message envelopes of both the originating and recipient subscribers' mailboxes. Status regarding the delivered message will be monitored and when the message is accessed by the recipient subscriber, the processor 101 will set a flag associated with that message and post a message heard indication in both the originator subscriber and the recipient subscriber's mailbox envelopes. Preferably, the processor 101 indicates that a message was heard if the message was accessed for more than three seconds.

When the originating subscriber selects option (4) for checking delivery of messages the subscriber is prompted to enter the recipient mailbox number. The subscriber can then listen to updated conditions on the delivered messages, for example, (a) "You have 1 message in that mailbox. This message has been heard." Or (b) "You have 2 message in that mailbox, message 1 has been heard and message 2 has not been heard." Or, if there is no message or the message has been erased by the recipient subscriber, (c) "You have no new messages in that mailbox." The messages which have not been heard can be erased or changed by the originator subscriber. Changing the message will not change the date or time of when the message was originally sent.

Upon completion of his selections in his mailbox, the subscriber can transfer to another mailbox by pressing zero.

Figure 6:
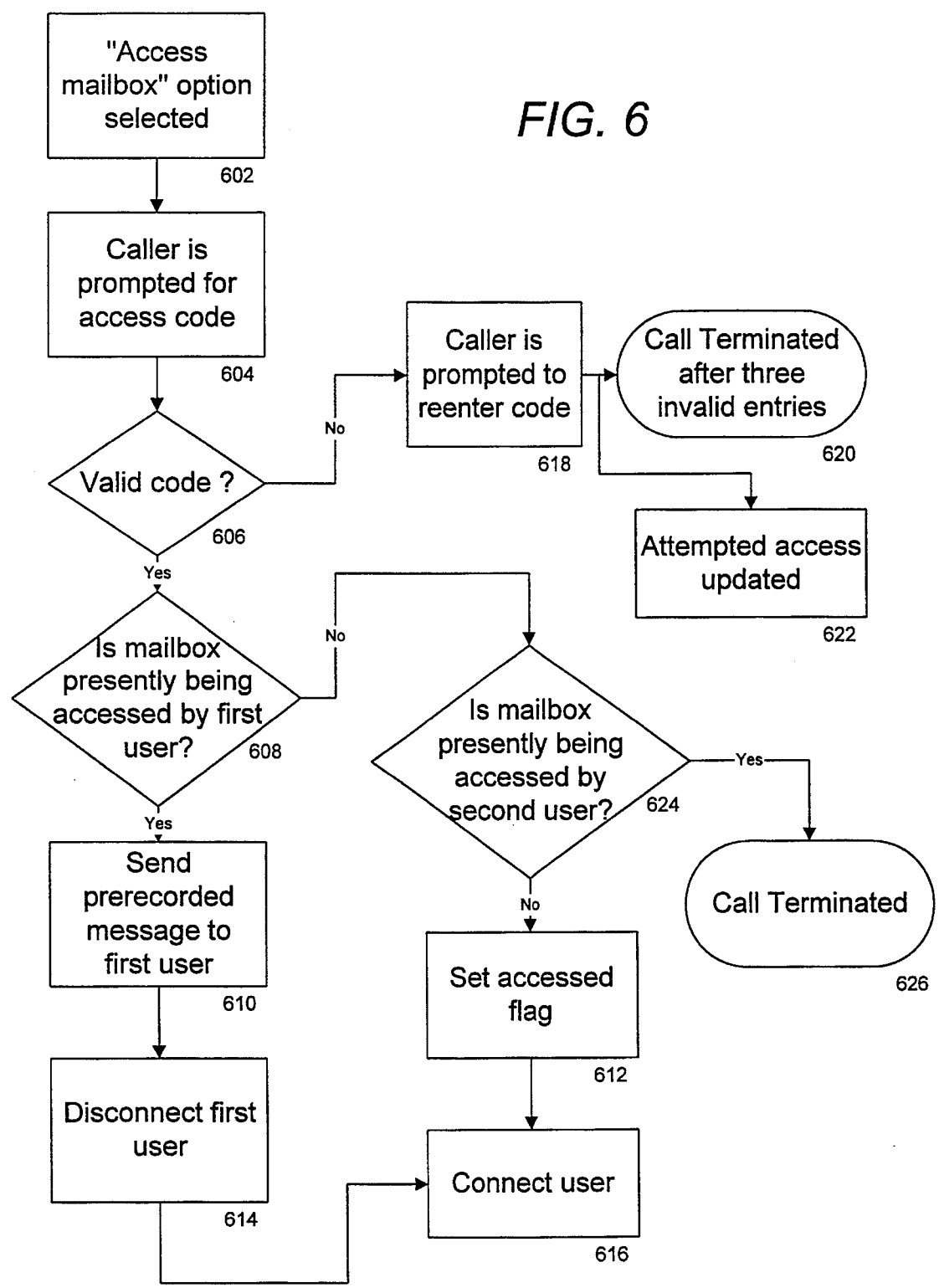
FIG. 6 illustrates a flow diagram of an operation of the voice processing system according to the present invention when more than one caller has the same access code.

In another aspect of the present invention as illustrated in FIG. 6, the voice processing system is capable of allowing a subscriber to reenter his mailbox when he has been locked-out or improperly disconnected from his mailbox. The file manager register 202 monitors the activities of each mailbox. A user is allowed three attempts at accessing his mailbox. After a first or second failure of entering the correct password, the processing 101 replays the prerecorded access code request message (step 618). After three failed attempts, the call is terminated (step 620) and the processor 101 updates the mailbox status register (step 622). Whenever a user is granted access to a mailbox (steps 602, 604, 606), the file manager system receives from the processor 101 the mailbox number and a signal indicating that the mailbox is being accessed (step 612). Upon disconnection of the user from the mailbox, the flag is released or reset. If the flag is set and a second user attempts to access the same mailbox with a valid access code (step (608), the file manager system first disconnects the first user (step 614) and then connects the second user to the mailbox (step 616). The first user is given a prerecorded message that "someone has accessed your mailbox" prior to being disconnected (step 614).

We claim:

1. A voice processing system coupled to a plurality of telephone stations comprising:

a tone detector for decoding DTMF signals received from said telephone stations a codec for converting voice signals to digital signals and digital signals to voice signals for communicating with said telephone stations;

a memory for storing mailboxes and programs including an operating system, each of said mailboxes including a mailbox status register for storing mailbox status information and a message envelope for storing message information;

means for granting a caller access to a mailbox upon entry by the caller of an access code matching a preassigned access code associated with an individual mailbox including means capable of granting access to said mailbox to a first user and a second user having the same access code, whereby when said second user enters said access code while said first user is accessing said individual mailbox, said first user is disconnected from said individual mailbox and said second user is granted access to said individual mailbox;

and means for indicating in said message envelope the times corresponding to when each of a plurality of messages was recorded and which of said recorded messages has been accessed.

2. A voice processing system according to claim 1, wherein said means for granting further includes means for recording the time and date of said access to a mailbox and means for indicating said time and date information in said status register of said mailbox.

3. A voice processing system according to claim 1 further including means for audibly announcing said message envelope information to said caller.

4. A voice processing system according to claim 1, further including a means capable of cancelling or changing said recorded messages which have not been accessed by the caller.

5. A telephone voice mail system coupled to a plurality of subscriber telephones for processing information including data representing a voice message sent from one subscriber to another, comprising:

a memory having individual mailbox memory blocks, each block being associated with one of said subscriber telephones and each block further having a mailbox message envelope for storing status information;

a voice converter for converting digital data to voice;

a processor for monitoring the transfer of said digital data including means for identifying the originator subscriber and recipient subscriber of said voice message, means for directing said digital data representing said voice message to said mailbox associated with said recipient subscriber and means for granting the originator subscriber access to said mailbox associated with said recipient subscriber while said recipient subscriber has access to said mailbox by disconnecting said recipient subscriber from said mailbox; and means for indicating in said mailbox message envelope associated with said originator subscriber the status of voice messages originated from said originator subscriber and sent to said recipient subscriber including an indication of which of said voice messages has been accessed by said recipient subscriber.

6. A telephone voice mail system according to claim 5, further including means capable of cancelling or changing said voice messages which have not been accessed by said recipient subscriber.

7. A telephone voice mail system according to claim 5, further including means for audibly announcing said message envelope information to said originator subscriber.

* * * * *